United States Patent

Onoda

[11] Patent Number: 5,913,082
[45] Date of Patent: *Jun. 15, 1999

[54] IMAGE SIGNAL PROCESSING APPARATUS

[75] Inventor: Hitoshi Onoda, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/740,219

[22] Filed: Oct. 25, 1996

[30] Foreign Application Priority Data

Oct. 27, 1995 [JP] Japan .................................. 7-302323
Jan. 31, 1996 [JP] Japan .................................. 8-015458

[51] Int. Cl.$^6$ .................................................. G03B 13/36
[52] U.S. Cl. .......................... 396/128; 396/95; 396/121; 396/122; 396/123
[58] Field of Search ............................. 396/95, 121, 122, 396/123, 125, 128

[56] References Cited

U.S. PATENT DOCUMENTS

| | | | |
|---|---|---|---|
| 4,720,724 | 1/1988 | Yokoo | 396/123 |
| 4,749,848 | 6/1988 | Sorimachi | 250/201 |
| 5,121,152 | 6/1992 | Wagner | 396/121 |
| 5,196,929 | 3/1993 | Miyasaka | 348/169 |
| 5,418,595 | 5/1995 | Iwasaki et al. | 396/95 |
| 5,615,398 | 3/1997 | Matsuyama | 396/128 |
| 5,615,399 | 3/1997 | Akashi et al. | 396/128 |

FOREIGN PATENT DOCUMENTS

| | | | |
|---|---|---|---|
| 2-282234 | 11/1990 | Japan | G03B 3/00 |
| 4-67607 | 10/1992 | Japan | G02B 7/11 |

*Primary Examiner*—Russell Adams
*Attorney, Agent, or Firm*—Fitzpatrick, Cella, Harper & Scinto

[57] ABSTRACT

An image signal processing apparatus for detecting a focusing state or a distance state by performing a correlation calculation of two images received by a light receiving section that includes a plurality of two dimensionally arranged photoelectric conversion elements. The apparatus includes a calculation circuit which divides a first area of the light receiving section into a plurality of blocks and calculates a focusing state or a distance state with respect to each of the plurality of blocks, a selection circuit which selects a second area included in the first area corresponding to the focusing state or the distance state of each of the blocks provided by the calculation circuit and a control circuit which divides the second area into a plurality of blocks and causes the calculation circuit to calculate a focusing state or a distance state with respect to each of the plurality of blocks.

15 Claims, 15 Drawing Sheets

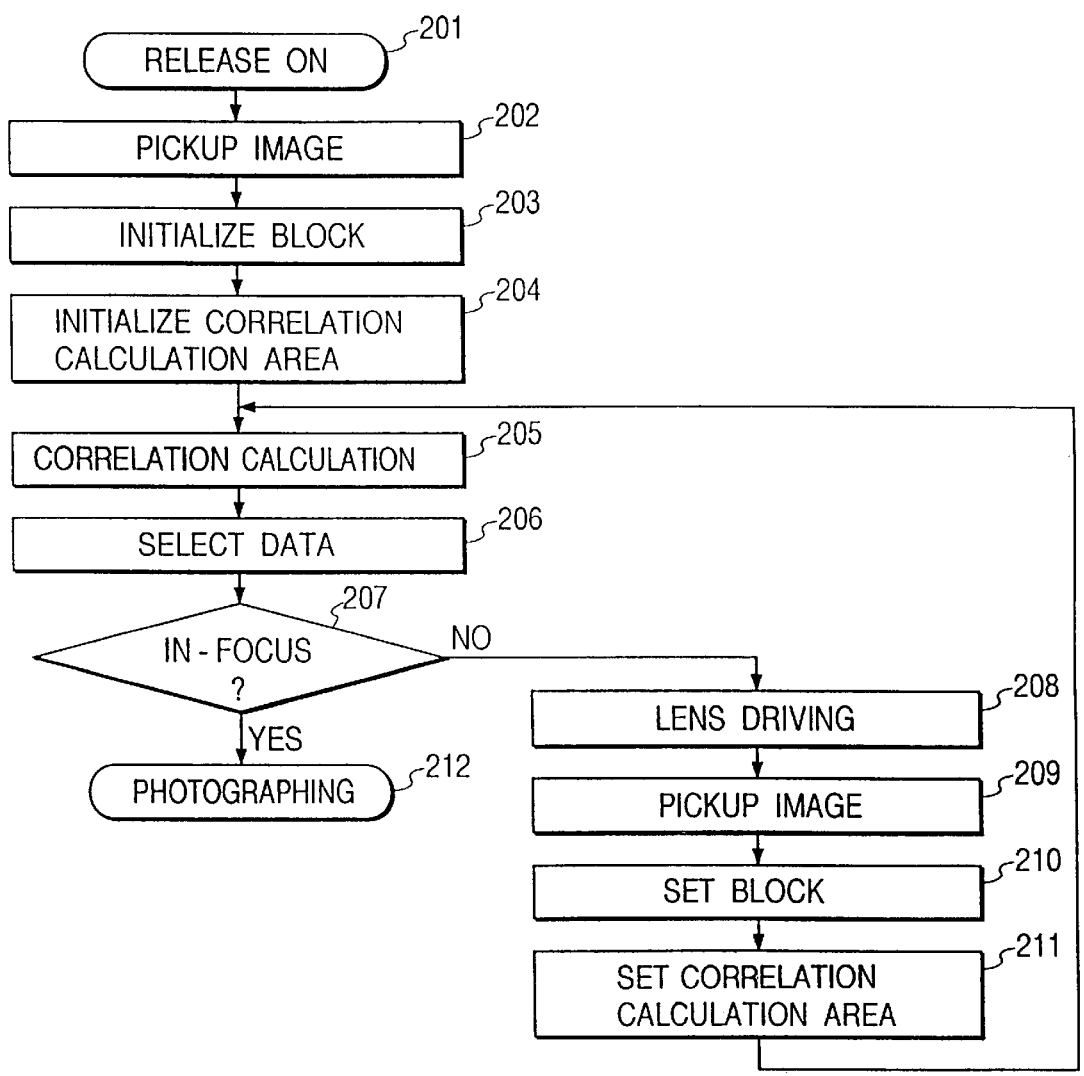

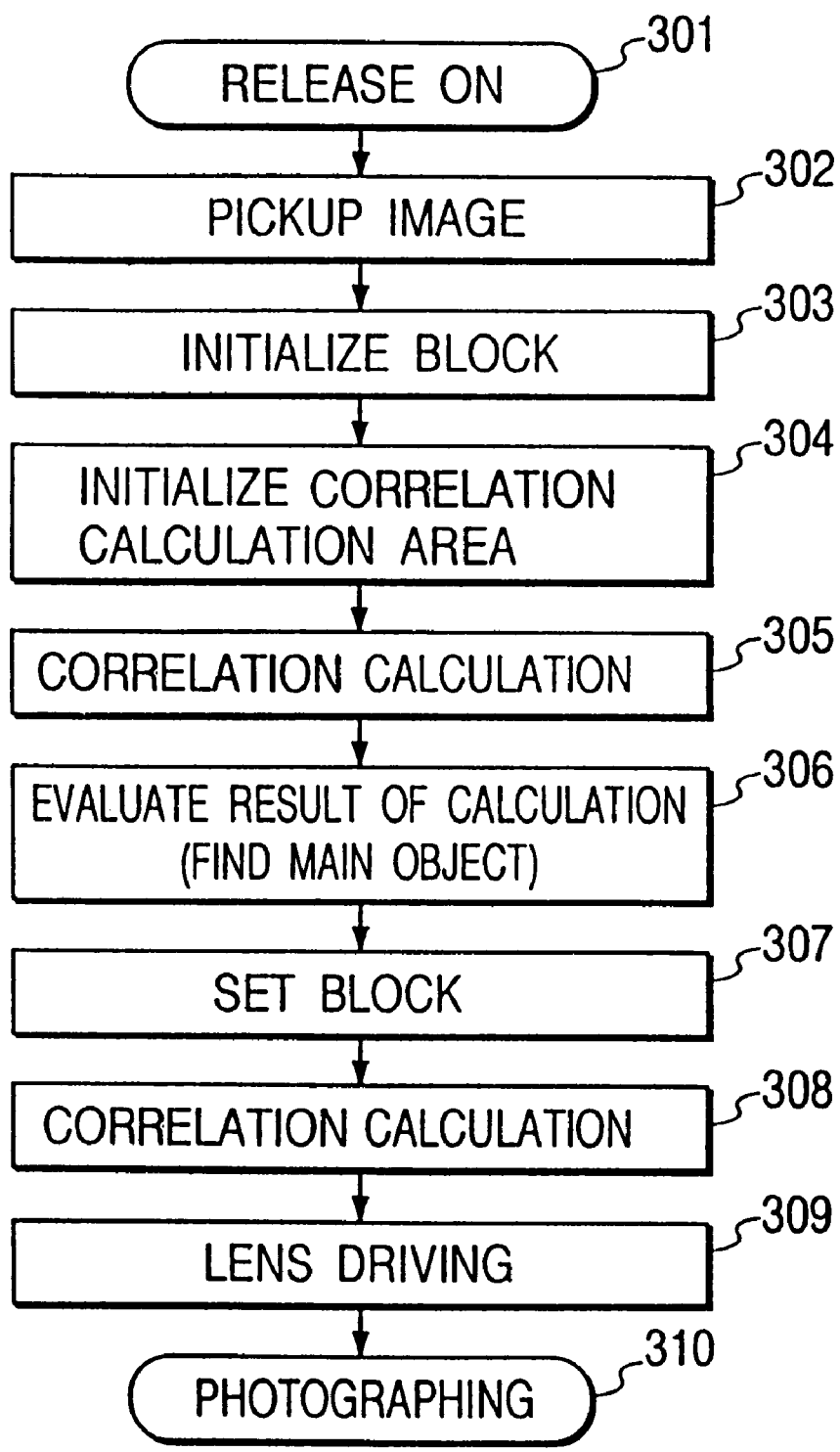

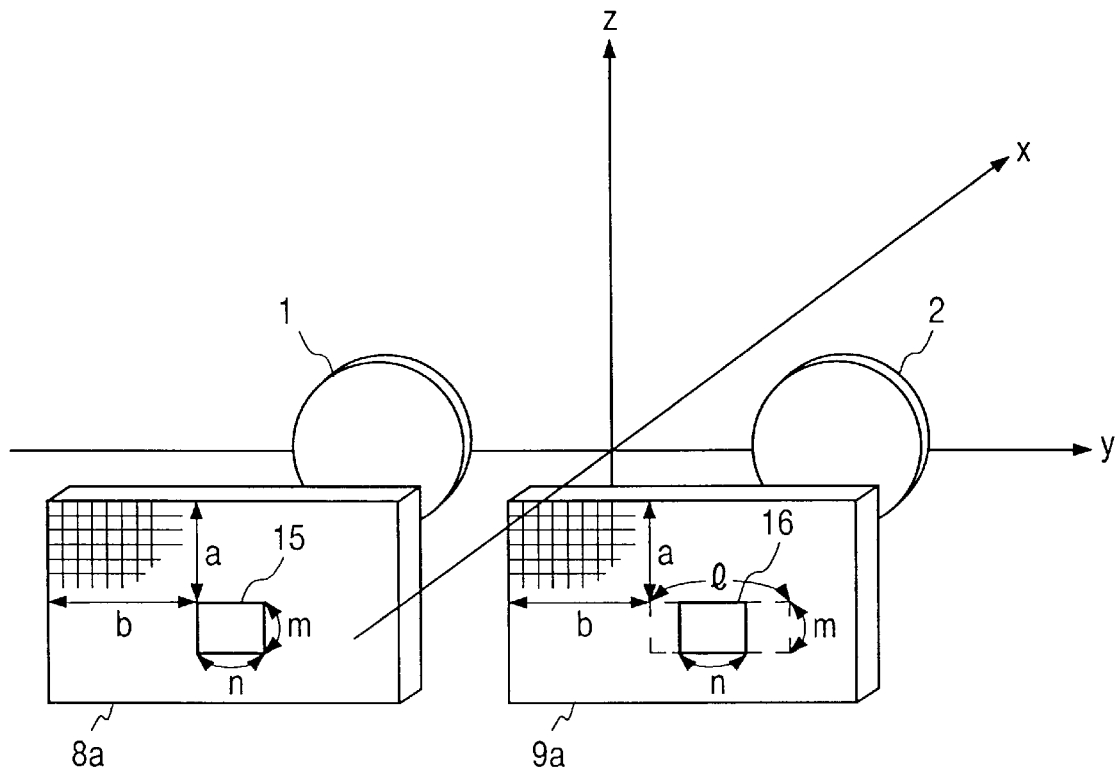

DIRECTION OF DIFFERENTIAL

135°   90°   45°   0°

[m]

| | | | | | | | ∞ | ∞ | ∞ | | |
|---|---|---|---|---|---|---|---|---|---|---|---|
| | | | | 1.5 | 1.5 | ∞ | ∞ | 7.0 | | 5.0 | |
| 1.0 | | 1.5 | | 1.5 | 1.5 | | 11.0 | 7.0 | 7.0 | 1.5 | 1.2 |
| 1.0 | 2.0 | | 1.5 | 1.5 | 1.5 | | 11.0 | 4.0 | 2.0 | 1.5 | 1.2 |
| 1.0 | 2.0 | 4.0 | | 1.5 | 1.5 | 1.5 | 9.0 | 4.0 | 2.0 | 1.5 | 1.2 |
| 1.0 | 2.0 | 4.0 | | 1.5 | 1.5 | | 9.0 | 4.0 | 2.0 | 1.5 | 1.2 |
| 1.0 | 2.0 | 4.0 | | 1.5 | 1.5 | | 9.0 | 4.0 | 2.0 | 1.5 | 1.2 |
| 1.0 | 2.0 | | 1.5 | 1.5 | 1.5 | 1.5 | | 4.0 | 2.0 | 1.5 | 1.2 |

IMAGE SIGNAL PROCESSING APPARATUS

BACKGROUND OF THE INVENTION

1. Field of the Invention

The present invention relates to an image signal processing apparatus which can be applied to an auto-focus camera and an environment recognition apparatus, and is used for distance measurements or defocus amount calculations.

2. Related Background Art

As one of methods of measuring the distance from a measurement apparatus to the object to be measured, a stereoscopic method is known, and is popularly used as an optical measurement means.

FIG. 8 is a view for briefly explaining the stereoscopic method. Referring to FIG. 8, lenses 1 and 2 have a focal length f, and also have optic centers 3 and 4. Optical axes 5 and 6 of the lenses 1 and 2 are assumed to be parallel to each other. Also, assume that each lens is an ideal one, and the influence of aberrations is not taken into consideration. The middle point between the optic centers 3 and 4 of the lenses is set as the origin of a coordinate system, the optical axis direction of each lens is set as an x-axis, and an axis connecting the optic centers 3 and 4 of the lenses is set as a y-axis. Also, an axis perpendicular to the x- and y-axes is set as a z-axis. Note that a plane x=−f corresponds to an imaging surface 7 of the two lenses. Image recording means 8 and 9 record images formed on the imaging surface. Assume that an object 10 to be measured is located at coordinates (x0, y0, z0). Images of the object 10 are formed at positions 11 and 12 by the two lenses. These positions 11 and 12 are those where straight lines connecting the object 10 and the optic centers 3 and 4 cross the imaging surface 7. If positions where the optical axes of the lenses and the imaging surface 7 cross are assumed to be reference positions 13 and 14 of the image recording means 8 and 9, distances $p_1$ and $p_2$ between the imaging positions 11 and 12 and the reference positions 13 and 14 are respectively given by:

$$p_1 = \left(y_0 + \frac{b}{2}\right)\frac{f}{x_0} \quad (1)$$

$$p_2 = \left(y_0 + \frac{b}{2}\right)\frac{f}{x_0} \quad (2)$$

where b is the base length between the two lenses. From the relationship between equations (1) and (2), the coordinate position of the object 10 to be measured can be expressed by:

$$x_0 = \frac{fb}{p_1 - p_2} \quad (3)$$

$$y_0 = \frac{p_1 + p_2}{p_1 - p_2}\frac{b}{2} \quad (4)$$

More specifically, the coordinate position of the object to be measured can be determined on the basis of the positions of the images of the object to be measured formed on the imaging surface 7. Depending on the applications of measurement results, a predetermined objective is often achieved when only $x_0$ can be determined. In such a case, $x_0$ can be determined by observing the shift amount $(p_1-p_2)$ between the two images before calculating the values $p_1$ and $p_2$. In many auto-focus cameras, the defocus amount of a lens need only be determined for focus adjustment, and in this case, focus adjustment can be performed by observing only the shift amount $(p_1-p_2)$ in place of calculating $x_0$. Therefore, in this application, the distance and image shift have the same meaning unless otherwise specified.

Normally, an object has an area, and often has a predetermined spread on the imaging surface due to, e.g., the blur of a lens. In such a case, it is difficult to detect the corresponding points of an identical object on the imaging surface. In view of this problem, the following method is normally used. That is, a correlation calculation is performed for two image signals output from the image recording means 8 and 9, and the shift amount is measured on the basis of the calculation result.

Various correlation calculation methods have been disclosed. In the following description, a very simple example will be briefly explained.

FIGS. 9A to 9C are graphs for explaining the concept of the correlation calculation. In an auto-focus camera, in order to convert two images formed by the stereoscopic method into an electrical signal, a line sensor obtained by linearly arranging very small photoelectric conversion light-receiving elements is used. An abscissa k in FIGS. 9A and 9B plots the pixel layout of the line sensor. In FIGS. 9A and 9B, the leftmost pixel is assumed to be the 0th pixel (k=0), and 1st, 2nd, . . . , nth pixels are set in turn to the right in FIGS. 9A and 9B (k=1, 2, . . . , n). The ordinate plots the signal output values of the respective pixels. These signal outputs $f_1(k)$ and $f_2(k)$ represent the output values of the above-mentioned two image signals. Note that the pattern of $f_2(k)$ is the same as that of $f_1(k)$ but is shifted to the right by d pixels. Equation (5) below is an example of a correlation calculation formula:

$$R(d) = \sum_{k=0}^{n} |f_1(k) - f_2(k+d)| \quad (5)$$

FIG. 9C shows an example of the result R(d). In this case, $d_{min}$ that minimizes R(d) is a value representing the shift between two images (i.e., corresponding to $(p_1-p_2)$ above).

In order to obtain a correct result by the correlation calculation, the image signals $f_1(k)$ and $f_2(k)$ must have a certain contrast, and even when the correlation calculation is performed using flat image signals without any contrast, the shift amount cannot be accurately calculated, and the calculation result includes large errors.

Also, when images of a plurality of objects having different distances are formed on an identical sensor, the distance cannot be accurately calculated, either. In order to prevent a plurality of images from being formed, the widths of the image detection means 8 and 9 shown in FIG. 8 must be reduced, and as a result, the distance measurement range is limited. For example, in the example shown in FIG. 8, when the widths of the image detection means 8 and 9 are reduced to have the reference positions 13 and 14 as the centers, the distance measurement range is limited to an object near the x-axis.

Furthermore, in the method using the line sensor as the image detection means, distance measurements can be performed for only an object near a plane of z=0 in FIG. 8.

In order to simultaneously measure objects present in more directions, a method using a plurality of optical systems and sensors, and a method of performing calculations by dividing the area of a relatively large line sensor into a plurality of areas have been disclosed. However, with these methods, measurements in arbitrary directions cannot be simultaneously performed.

As a means for simultaneously measuring the distances to a plurality of objects present in arbitrary directions, a method using an area sensor obtained by two-dimensionally arranging very small light-receiving elements in place of the line sensor has been disclosed (Japanese Patent Publication No. 4-67607). According to this method, when an image shift detection is performed for a portion in a two-dimensional image signal output from the area sensor, image shifts of objects in arbitrary directions including the z-direction can be simultaneously detected.

When a multi-direction distance measurement is performed using this method, the layout of objects in a space or the shapes of individual objects can be recognized, and hence, this method can be used as an environment recognition means.

Upon executing measurements in the respective directions, a procedure for extracting a portion in a two-dimensional image signal corresponding to the direction of interest as an object for shift amount observation is required. Normally, this extracted signal consists of a rectangular block of n [pixels]×m [pixels] (n, m: integers). FIG. 10 is a view for explaining the block extraction procedure. The coordinate system in FIG. 10 is the same as that shown in FIGS. 9A to 9C. Referring to FIG. 10, 8a and 9a represent area sensors. Lattices shown on the area sensors 8a and 9a represent the pixel layouts of very small light-receiving elements. In order to calculate the distance to an object in a predetermined direction, the output signal from a rectangular block area 15 having n [pixels]×m [pixels] on the sensor 8a is extracted. By changing the position of this block, a measurement in an arbitrary direction can be realized. A signal corresponding to an image signal in a block 16 on the sensor 9a is extracted, and a correlation calculation with the signal on the sensor 8a is performed. In this case, correlation calculations with a plurality of blocks are performed while shifting the extraction position in the image shift direction (y-direction). For example, in FIG. 10, correlation calculations are performed between signals in a plurality of n [pixels]×m [pixels] blocks included in the range of a calculation target area 16 of l [pixels]×m [pixels] (l>n) indicated by a dotted line on the sensor 9a, and the signal in the block 15, thereby calculating the image shift amount. Note that the position and the range of the calculation target area 16 are set on the basis of the state of the optical system used, the measurement purpose, and the nature of the object to be measured.

In the above description, the extraction position of the output signal from only one sensor is shifted. Also, similar calculations may be made by shifting the extraction positions of the two blocks with respect to each other.

Conventionally, in a series of distance measurement operations, the signal extraction block has a rectangular shape, and its size is fixed.

If image shift detection is performed using a relatively small signal extraction block, high measurement precision is assured when the image in the block has a sufficiently high contrast. However, when the block is small, an image with a high contrast is often not included in the block. In such a case, it is difficult to perform shift detection, and large measurement errors occur frequently.

Conversely, when an image shift detection is performed using a large block, an image with a high contrast is included in the block with high probability, and large measurement errors hardly occur unlike in the measurement using the small block. However, when the block is large, the absolute distance measurement precision often lowers as compared to the measurement of a high-contrast image using a small block.

In the case of a large block, images of a plurality of objects having different distances may also be formed, and such images disturb an accurate distance calculation. Such problem is called "perspective conflict".

Owing to the above-mentioned nature, the conventional method suffers from the following problems:

An appropriate distance measurement that can satisfy the required measurement precision cannot be performed.

An appropriate distance measurement cannot be performed in correspondence with the contrast of an image of the object to be measured.

The influence of perspective conflict cannot be properly avoided.

A conventional camera capable of multi-point distance measurement adopts, as a method of selecting a final distance measurement point, a method of selecting the "nearest" distance measurement area from a plurality of distance measurement results. However, since this method often causes distance measurement errors, a selection method having the following algorithm has been proposed (Japanese Laid-Open Patent Application No. 2-282234). That is, in this algorithm, for example, when the distance measurement results at three points have specific patterns, i.e., far, middle, and near patterns, the distance measurement point corresponding to "middle" is selected (since "near" may often correspond to the ground surface or the like).

The method of selecting a distance measurement point when the distance measurement is performed using the area sensor will be described below taking as an example a case wherein a scene shown in FIG. 17 is to be photographed.

The photographing frame is divided into many blocks (each including a set of a plurality of pixels on the area sensor), and distance measurements are performed to obtain distance distribution information (distance map), as shown in FIG. 18. In order to determine the layout of objects in the object field space, objects that constitute the space are grouped.

FIG. 19 shows the grouping result on the basis of the distance map data shown in FIG. 18, and areas are divided in units of objects as a result of the grouping.

As an actual grouping method, some methods are generally known. The simplest example is a method of determining, for all adjacent blocks, that two blocks form an identical object if the difference between the distances (or defocus amounts) of the two adjacent blocks is equal to or smaller than a predetermined value.

With the above-mentioned method, the frame is divided (grouped) into areas in units of objects that constitute the photographing space, as shown in FIG. 19.

Thereafter, the area of a main object is determined from the objects that constitute the photographing space on the basis of, e.g., distance information, size information of the objects, the position information of the objects on the frame, and the like.

However, in the above-mentioned selection method, in a scene shown in FIG. 20, i.e., a scene where a table 2 is present in front of a person 1 as a main object, since the distance between the table 2 and the person 1 is small, an area for measuring the distance to the table 2 and tableware is undesirably selected. Therefore, in this case, the photographer must switch the distance measurement area selection mode to the manual mode so as to select a desired distance measurement area, and must manually select the distance measurement area, resulting in cumbersome operations.

SUMMARY OF THE INVENTION

One aspect of the application is to provide an image signal processing apparatus for detecting the focusing or distance state by performing a correlation calculation between two images received by a two-dimensional photoelectric conversion element array, which can detect the focusing or distance state more appropriately, since it comprises setting means for setting the range of image signals to be subjected to the correlation calculation processing in accordance with the shape or attribute of an object to be measured or the contrast of the received images.

One aspect of the application is to provide an image signal processing apparatus for detecting the focusing or distance state by performing a correlation calculation between two images received by a two-dimensional photoelectric conversion element array, which can detect the focusing or distance state appropriately, since it comprises setting means for setting the range of image signals to be subjected to the correlation calculation processing to be a first range to perform the correlation calculation, and thereafter, re-setting the correlation calculation processing range on the basis of the shape or attribute of an object to be measured or the contrast, which is obtained in accordance with the correlation calculation result.

One aspect of the application is to provide, under the above object, an image signal processing apparatus which determines the shape or attribute in correspondence with characteristic values of individual portions in the first range obtained based on the correlation calculation result in the first range, and re-sets a local area in the first range.

One aspect of the application is to provide an image signal processing apparatus for detecting the focusing or distance state by performing a correlation calculation between two images received by a two-dimensional photoelectric conversion element array, which can appropriately detect the focusing or distance state, since it sets the range of image signals to be subjected to the correlation calculation processing to be a first range, divides the first range into a plurality of blocks to perform the correlation calculation in units of blocks, determines the ranges of blocks in correspondence with the correlation calculation results, and performs the correlation calculation processing again in units of blocks determined.

One aspect of the application is to provide an image signal processing apparatus for detecting the focusing or distance state by performing a correlation calculation between two images received by a two-dimensional photoelectric conversion element array, which can appropriately detect the focusing or distance state, since it sets the range of image signals to be subjected to the correlation calculation processing to be a first range, divides the first range into a plurality of blocks to perform the correlation calculation in units of blocks, re-sets a correlation calculation range in a portion of the first range in accordance with the correlation calculation results, and performs the correlation calculation processing in units of blocks obtained by dividing the re-set correlation calculation range into blocks smaller than the blocks.

One aspect of the application is to provide an image signal processing apparatus which can appropriately detect the focusing or distance state by dividing an area sensor into a plurality of blocks, evaluating image signals in units of blocks, designating a predetermined area of the area sensor on the basis of the evaluation results, dividing the designated area into a plurality of blocks, and evaluating image signals again in units of blocks.

One aspect of the application is to provide an image signal processing apparatus which can appropriately detect the focusing or distance state by obtaining the shape of an image on the basis of the evaluation results of image signals in units of blocks, setting a block shape in correspondence with the obtained shape, and evaluating image signals again in the set block shape.

One aspect of the application is to provide an image signal processing apparatus which can appropriately perform focus detection by inhibiting selection of one, corresponding to an object with a large degree of inclination, of detection results detected on multi-point focus detection areas.

Other objects of the present invention will become apparent from the following description of the embodiments taken in conjunction with the accompanying drawings.

BRIEF DESCRIPTION OF THE DRAWINGS

FIG. 4 is a flow chart for explaining the operation in another embodiment of the present invention;

FIG. 6 is a flow chart for explaining the operation in still another embodiment of the present invention;

FIG. 10 is a view for explaining block signal extraction;

FIG. 11 is an explanatory view for explaining the flow chart shown in FIG. 2;

DETAILED DESCRIPTION OF THE PREFERRED EMBODIMENTS

The embodiment of the distance measurement method or apparatus of the present invention will be described hereinafter.

In the following description, an auto-focus camera, which automatically determines the main object from objects in the object field space, and adjusts the focal point on the main object, will be exemplified.

Figure 1:
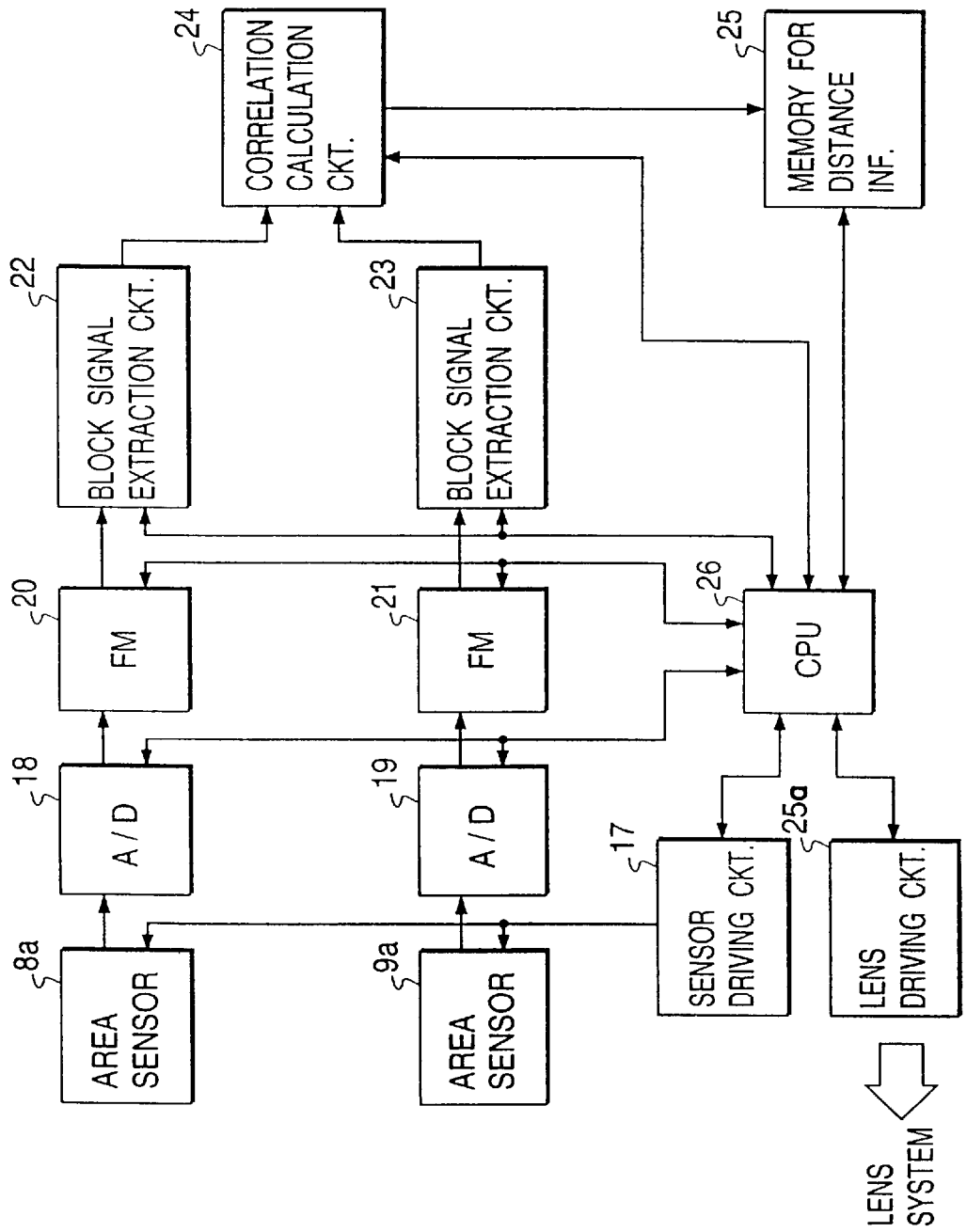
FIG. 1 is a block diagram showing an embodiment of an image signal processing apparatus according to the present invention.

FIG. 1 is a block diagram showing an embodiment of the present invention. Referring to FIG. 1, area sensors 8a and 9a as two-dimensional arrays of very small light-receiving pixels are driven by a sensor driving circuit 17. A/D converters 18 and 19 convert the outputs from the sensors into digital signals. Frame memories 20 and 21 store the A/D-converted image signals. Block signal extraction circuits 22 and 23 extract signals of blocks to be subjected to a correlation calculation from predetermined areas of the corresponding frame memories. A CPU 26 serves as a processing circuit, and controls designation of addresses, designation of the shape and size of blocks, and start of extraction execution. The signals of blocks output from the block signal extraction circuits 22 and 23 are input to a correlation calculation circuit 24, and the correlation calculation result is stored at a predetermined address in a memory 25 for distance information.

The CPU 26 can perform focus adjustment by supplying a signal to a lens driving circuit 25. Furthermore, the CPU 26 is connected to other control circuits to control the entire camera, although not shown.

Figure 2:
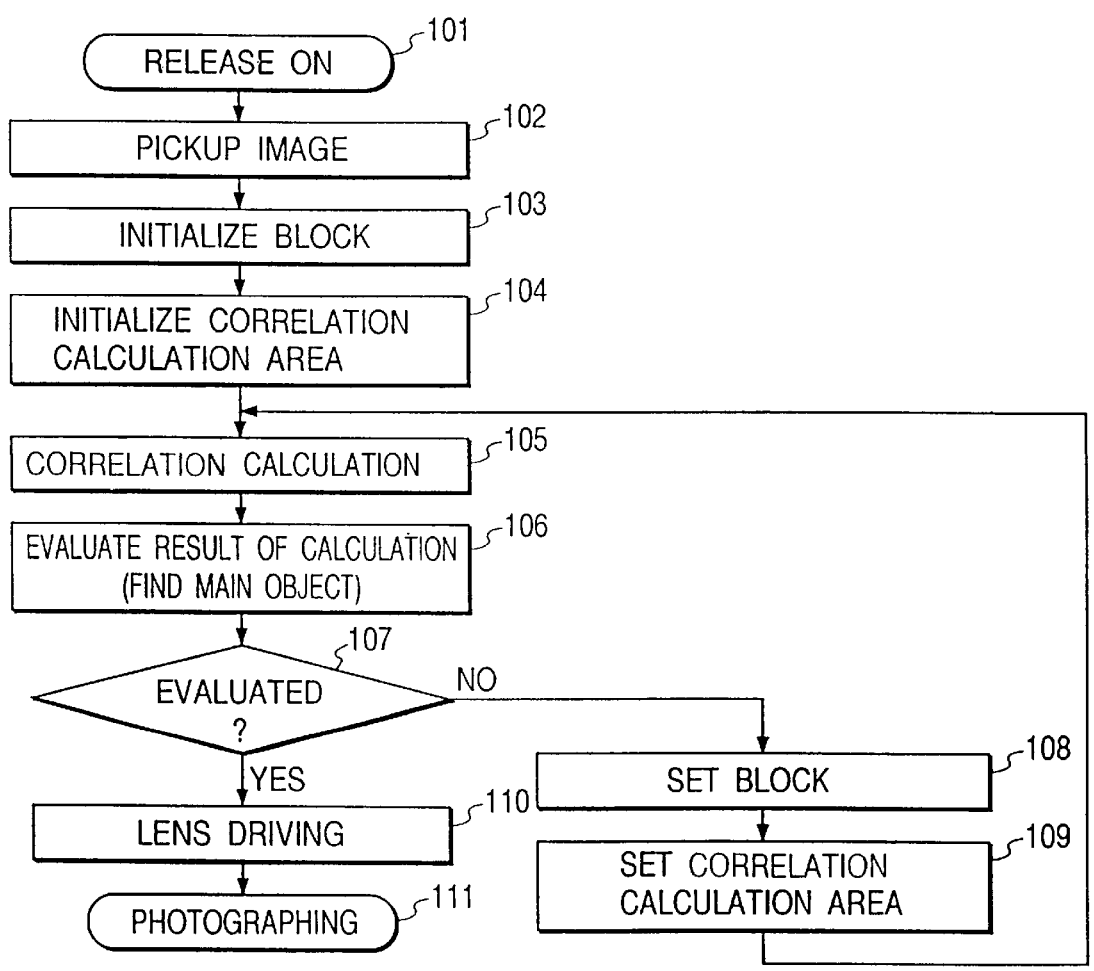
FIG. 2 is a flow chart for explaining the operation of the apparatus shown in FIG. 1.

FIG. 2 is a flow chart for explaining the operations of the blocks shown in FIG. 1. Step (101) is started in response to a predetermined cue such as depression of the shutter button by the photographer. In step (102), the CPU 26 supplies a control signal to the sensor driving circuit 17, the A/D converters 18 and 19, and the frame memories 20 and 21 to pick up images formed on the sensors.

In step (103), the CPU 26 supplies a signal to the block signal extraction circuits 22 and 23 to initialize the shape and size of a block. In this case, an optimal shape and size of the block are set in correspondence with the focal length of a lens, the photographing mode, the exposure condition, and the like. However, since the purpose of the first correlation calculation is to estimate the position of the main object on the basis of distance information of the entire object space, distance information with high precision is not required, but distance information (defocus information) with a low error frequency is required. Therefore, the block is set to have a relatively large rectangular shape.

Figure 3A:
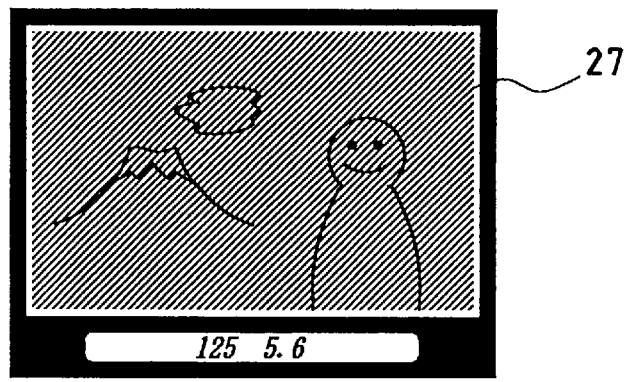
FIGS. 3A and 3B are views showing the photographing frame and the calculation area for explaining the flow chart shown in FIG. 2.

In step (104), the correlation calculation target area is initialized. FIG. 3A shows an example of the photographing frame. In order to check the distance information (defocus information) of the entire area in each area sensor, a broad range of an image, e.g., the entire frame, is set to be the calculation target area in the first correlation calculation. In this case, a hatched area 27 (entire frame) in FIG. 3A corresponds to an initial calculation target area, and a plurality of signal extraction areas are set in this area. When the distance measurement block has a rectangular shape, a plurality of signal extraction areas are set, so that rectangles are arranged at, e.g., equal intervals.

In step (105), a plurality of distance measurement points (focus detection areas) are set in the calculation target area, signals are extracted in accordance with the shape and size of the block set in step (103) from those near these distance measurement points (focus detection areas), and a correlation calculation is performed. As a result, a plurality of pieces of distance information (defocus information) representing the distribution state of the distances (defocus amounts) in the calculation target area are stored in the memory 25.

For example, if the entire area sensors 8a and 9a serve as areas corresponding to the entire frame, and the block set in step (103) correspond to each of blocks 1b to 36b obtained by dividing the entire frame into 36 blocks, correlation calculations are performed in units of corresponding blocks of the area sensors 8a and 9a. Consequently, the correlation calculation results in units of blocks, i.e., distance information (defocus information), are obtained, and are stored in the memory 25.

In step (106), the main object area is estimated by a predetermined algorithm with reference to the distance information (defocus information) stored in the memory 25. When there are a plurality of objects that appear to be the main object, a plurality of areas are selected. As the predetermined algorithm, the following methods may be used:

A method of selecting the area of the nearest one of objects estimated based on the distance data (defocus data); or A method of selecting the area of an object, whose outer shape or size is similar to that of a person, of those estimated based on the distance data (defocus data). In this application, the method of discriminating if the outer shape is similar to a person is used. In this case, the following processing is performed. For example, assume that the memory 25 stores distance information of 2 m (identical defocus amount) in correspondence with the blocks 23b, 28b to 30b, and 34b to 36b, and stores information of 10 m (the defocus amount different from that of the above blocks) in correspondence with other blocks. In this case, the shape of an area defined by the blocks of 2 m is similar to that of a person, and this area is selected.

In the measurement performed so far for the purpose of estimating the main object position, since the calculations are performed using large blocks, information having precision required for focus adjustment has not been obtained yet. When calculations are performed using fixed blocks like in the prior art, only information with low precision is obtained, and the auto-focus operation cannot be performed with high precision.

In contrast to this, in the present invention, since the shape and size of the block can be changed, both estimation of the main object and the auto-focus operation with high precision can be realized.

In step (107), it is checked if the position of the object and the distance to the main object have been specified. If they are not specified yet, the flow advances to step (108); otherwise, the flow advances to step (110). In the first stage, since only the area of the main object is determined, and the distance (defocus amount) to the main object is not determined yet, the flow advances to step (108).

In step (108), in order to check the distance information (defocus information) of the main object area evaluated in step (106) in more detail, the shape and size of the signal extraction clock are set again. Since the focus detection precision required for the above-mentioned recognition of the object space is different from the precision required for the auto-focus operation, the shape and size of the block are changed to attain optimal control. Normally, the block is set to have a rectangular shape smaller than that of the initially set block so as to avoid the influence of, e.g., perspective conflict and to obtain distance information (defocus information) that can meet the precision required for the auto-focus operation.

Figure 3B:
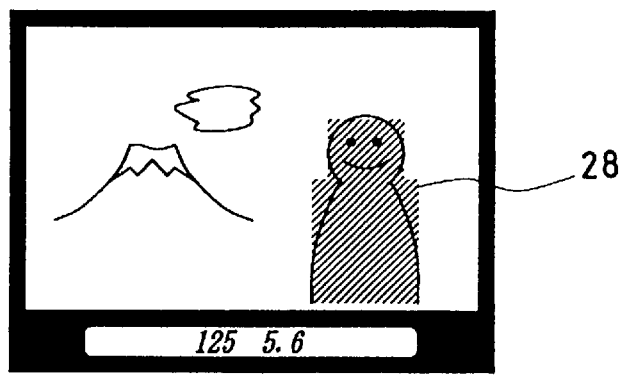

In step (109), the estimated main object area evaluated in step (106) is set as the next calculation target area. In FIG. 3B, a hatched area 28 represents an example of the estimated main object area in step (106), and a plurality of signal extraction areas (set in step (108) to be smaller blocks than those set in step (103)) are set in this area.

In step (105), a correlation calculation is executed again. In the second and subsequent correlation calculations, since the block size is changed to be smaller than the previous size, measurements can be performed with higher precision than that of the previous calculation results. When the block size is set to be small, an area having a low contrast suffers a high frequency of large errors. However, in the present invention, the calculation results obtained using small blocks can be compared with the previous ones obtained using large blocks, and the reliability of the calculation results obtained using small blocks can be evaluated. For example, a block, the calculation result of which becomes larger than that obtained using a large block and is determined to be unnatural, may be considered to be an area with a low reliability, and may be excluded from candidates of main object discrimination or lens driving data.

More specifically, when the correlation calculation results obtained using the small blocks set in step (108), i.e., the distance information (defocus information), are considerably different from those in the blocks of the estimated main object area initially evaluated in step (106), such blocks are excluded, and only the correlation calculation results of the remaining blocks serve as the objects to be evaluated in step (106).

On the other hand, the contrast of each calculation target block may be calculated before the correlation calculation, and only blocks with high contrast may be subjected to correlation calculations. In this case, blocks with low contrast may be excluded from candidates of main object discrimination or lens driving data without being subjected to correlation calculations.

In step (106), the main object is discriminated again. In the second and subsequent discriminations, since more detailed distance information (defocus information) is obtained for the previously estimated main object area, the position where the focal point is to be adjusted can be further limited.

When the area is sufficiently limited, distance information (defocus amount) used in focus adjustment is determined on the basis of the nearest distance or the average of distances of the distance information (defocus information) in the area.

If the main object is specified and the position where the focal point is to be adjusted is determined in step (106), it is determined in step (107) the evaluation has been completed, and the flow advances to step (110). On the other hand, if it is determined in step (106) that the obtained information is insufficient for specifying the main object, or if the main object can be specified, but distance information (defocus information) with precision required for focus adjustment cannot be obtained, the flow advances to step (108) again, and calculations and evaluations are performed in more detail.

In step (110), the lens is driven to adjust the focal point to the main object on the basis of the calculation results in step (106). Upon completion of the lens driving operation, the processing advances to a photographing procedure such as exposure onto a film in step (111).

As described above, when the entire object field space is to be recognized, i.e., when the absolute precision of the distance measurement (defocus measurement) can be low, and it is rather preferable that the number of extreme errors be small, distance measurement (defocus) calculations are performed by extracting signals in large blocks. On the other hand, when the focal point is to be adjusted in practice, i.e., when the distance measurement (defocus measurement) with high precision is required, distance measurement (defocus) calculations are performed by extracting signals in small blocks. In this manner, "measurements corresponding to required precision" that cannot be attained in the prior art can be realized.

When a plurality of signal extraction areas are appropriately set in correspondence with the situation of a desired object or the like, the calculation time can be shortened without performing distance measurements for unwanted areas.

In this embodiment, the present invention is applied to a camera. Alternatively, when the present invention is applied to, e.g., an air conditioner, the direction of a person present in the room can be determined, and the wind direction can be changed to the determined direction. In this manner, the present invention can also be applied to the environment recognition field.

Another embodiment (second embodiment) of the present invention will be described below. In this embodiment, measurements are performed using an image formed by a light beam that has passed through an optical system such as an exchangeable lens of an auto-focus single-lens reflex camera.

Although the arrangement of the apparatus is the same as that shown in FIG. 1, the sequence for controlling the CPU 26 is different from that in the above embodiment. FIG. 4 is a flow chart for explaining the operation in the second embodiment of the present invention. The operation of this embodiment will be described below with reference to the flow chart. Step (201) of automatic focus adjustment is started in response to a predetermined cue such the depression of the shutter button by the photographer. In step (202), the CPU 26 supplies a control signal to the sensor driving circuit 17, the A/D converters 18 and 19, and the frame memories 20 and 21, so that image signals formed on the sensors are picked up by the frame memories.

In step (203), the CPU 26 supplies a signal to the block signal extraction circuits 22 and 23 to initialize the block shape and size. In this case, an optimal shape and size are set in correspondence with the focal length of a lens, the photographing mode, the exposure condition, and the like. However, when image shift detection is performed based on light that has passed through the lens for performing focus adjustment in practice, since the focal point position is normally assumed to be shifted largely, it is highly probable that the image used in the image shift detection be blurred. The blurred image does not include any fine pattern, and the error frequency increases even when shift observation is performed using a small block size. For this reason, optimal calculations are attained by initially setting, e.g., a relatively large rectangular block. In other words, when the block size is sufficiently large, each block often includes some pattern, and large errors can be avoided in shift observation. Therefore, such a block size is suitable for initial measurements.

Figure 5:
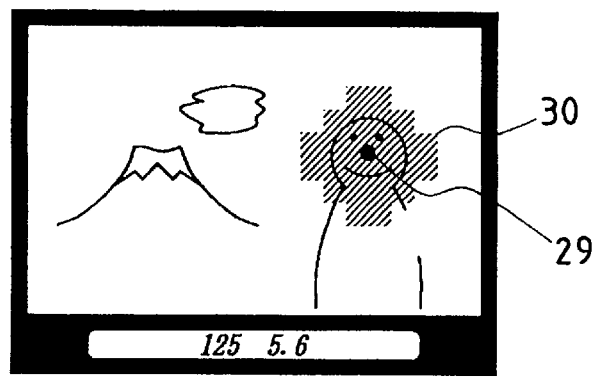
FIG. 5 is a view showing the photographing frame and the calculation area or explaining the flow chart shown in FIG. 4.

In step (204), the initial correlation calculation target area is set to include the focus adjustment direction. Note that the focus adjustment direction is set to have, as the center, an area determined in advance by the photographer's will using, e.g., means for detecting the visual axis direction of the observer. FIG. 5 shows an example of the photographing frame. When the position where the focal point is to be adjusted is, e.g., a point 29 in FIG. 5, a surrounding area 30 of this point (hatched area) is set as the initial correlation calculation target area, and a plurality of signal extraction areas are set in this area.

In step (205), correlation calculations are executed. As a result of the correlation calculations, the memory 25 shown in FIG. 1 stores distance information (defocus information) of the calculation target area.

In step (206), data to be used for driving lens are selected from the plurality of correlation calculation results in the calculation target area. As the selection algorithm, an algorithm for selecting data with a higher reliability from the calculation results of the respective blocks may be used. However, since the contents of this algorithm do not relate to the present invention, a detailed description thereof will be omitted.

In step (207), it is checked based on the correlation calculation results selected in step (206) if the lens is in an in-focus state or an out-of-focus state. If the lens is in an in-focus state, the flow advances to step (212); otherwise, the flow advances to step (208).

In step (208), the lens is driven to attain an in-focus state on the basis of the correlation calculation results selected in step (206).

In step (209), images are picked up again. In steps (210) and (211), the block size and the calculation area are set. In this process, since an image closer to an in-focus state than the previous image is obtained as a result of the lens driving operation, the image to be measured has a higher contrast. When the object to be measured has a high contrast, calculations with sufficiently high precision can be attained even when the block size is small. For this reason, the block size is set to be smaller than the previous size to improve the distance (defocus) calculation precision. On the other hand, the correlation calculation area is limited to an area which is determined in step (206) to have high reliability of the correlation calculation results. More specifically, a small area in the area set in step (204) is set.

In step (205), correlation calculations are performed again. In step (206), data are also selected again.

If it is determined in step (207) that the lens is in an in-focus state, the flow advances to step (212), and the control enters the photographing procedure such as exposure onto a film.

As described above, when an image has a low contrast as in an out-of-focus state, correlation calculations are performed using large signal extraction blocks, and as the contrast of an image becomes higher since the lens is closer to an in-focus state, correlation calculations are performed using smaller signal extraction blocks. In this manner, a high-precision auto-focus mechanism can be realized while suppressing detection errors of the focal point position.

When a plurality of signal extraction areas are appropriately set in correspondence with the situation of contrast or the like, the calculation time can be shortened without performing distance measurements for unwanted areas.

FIG. 6 is a flow chart showing still another embodiment of the present invention. Note that this embodiment uses the apparatus shown in FIG. 1. The operation of this embodiment will be described below with reference to the flow chart. Step (301) is started in response to a predetermined cue such as the depression of a shutter button by a photographer.

In step (302), the CPU 26 supplies a control signal to the sensor driving circuit 17, the A/D converters 18 and 19, and the frame memories 20 and 21 to pick up images formed on the sensors.

In step (303), the CPU 26 supplies a signal to the block signal extraction circuits 22 and 23 to initialize the block. An optimal size and shape of the initial block are set in correspondence with the focal length of a lens, the photographing mode, the exposure condition, and the like. However, since the purpose of the first correlation calculation is to estimate the position of the main object on the basis of distance information (defocus information) of the entire object space, distance information with high precision is not required, but distance information with a low error frequency is required. Therefore, a relatively large block size is set.

Figure 7A:
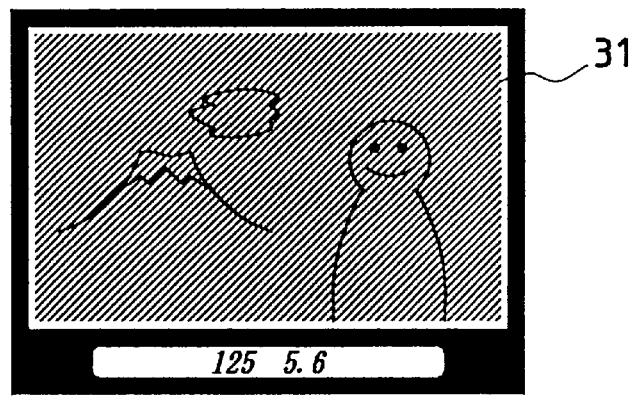
FIGS. 7A to 7C are views showing the photographing frame and the calculation area for explaining the flow chart shown in FIG. 6.

In step (304), the correlation calculation target area is initialized. FIG. 7A shows an example of the photographing frame. In order to check the distance information (defocus information) of the entire area in each area sensor, a broad range of an image, e.g., the entire frame, is set to be the calculation target area in the first correlation calculation. In this case, a hatched area 31 (entire frame) in FIG. 7A corresponds to an initial calculation target area.

In step (305), correlation calculations are performed for a plurality of blocks in the calculation target area, and the memory 25 stores the distance information (defocus information) of the calculation target area.

Figure 7B:
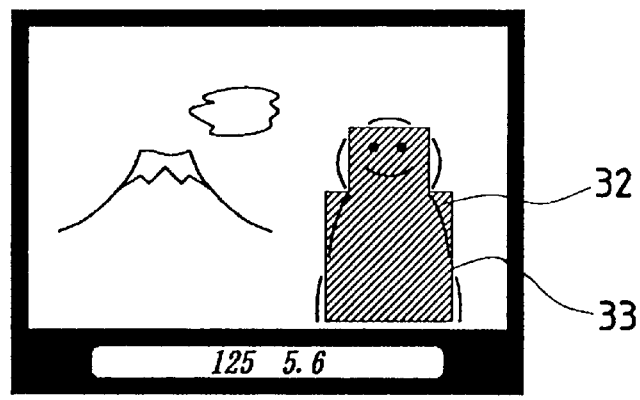

In step (306), the main object position is estimated by a predetermined algorithm with reference to the distance information of the object space. As the predetermined algorithm, the following method is normally used:

A method of selecting an object, the distance to which is shortest, in principle; or A method of selecting an object, whose outer shape constituted based on distance data is similar to that of a person. In this embodiment, shape discrimination is performed. If it is estimated based on the discrimination result of this algorithm that the main object is present in a hatched region 32 in FIG. 7B, the block shape is set to be the shape (hatched area) of the main object in step (307).

Note that the shape discrimination of the main object is attained by the method described above with reference to the flow chart of FIG. 2.

Since the conventional apparatus cannot appropriately change the size or shape of an extracted signal, and cannot obtain higher distance measurement precision, the lens may often be driven based on inaccurate distance measurement results influenced by perspective conflict. In view of this problem, in the present invention, since the shape of the signal extraction block is set in correspondence with the shape of the main object obtained in step (306), accurate correlation calculations of the main object can be performed in step (308).

In step (309), the lens is driven based on the calculation results in step (308), so that the focal point is adjusted to the main object. Upon completion of the lens driving operation, the control enters the photographing procedure such as exposure onto a film in step (310).

When a plurality of object images having different distances are present in the extracted signal, the image shift amount obtained by the correlation calculations may often have an intermediate value with respect to the original image shift amount of each object, and calculation of an accurate image shift amount fails. Such a phenomenon is called a perspective conflict, and cannot be avoided in the conventional calculation method. However, as described in the above embodiments, when the correlation calculations are executed by matching the block shape with that of the object to be measured, the influence of image signals other than that of the object to be measured can be excluded, and the problem of perspective conflict can be avoided.

Figure 7C:
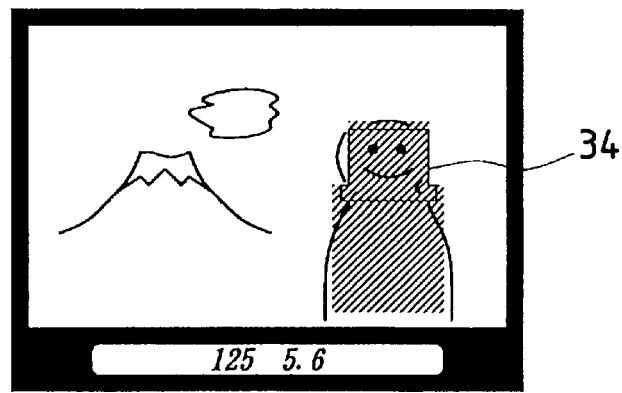
Figure 8:
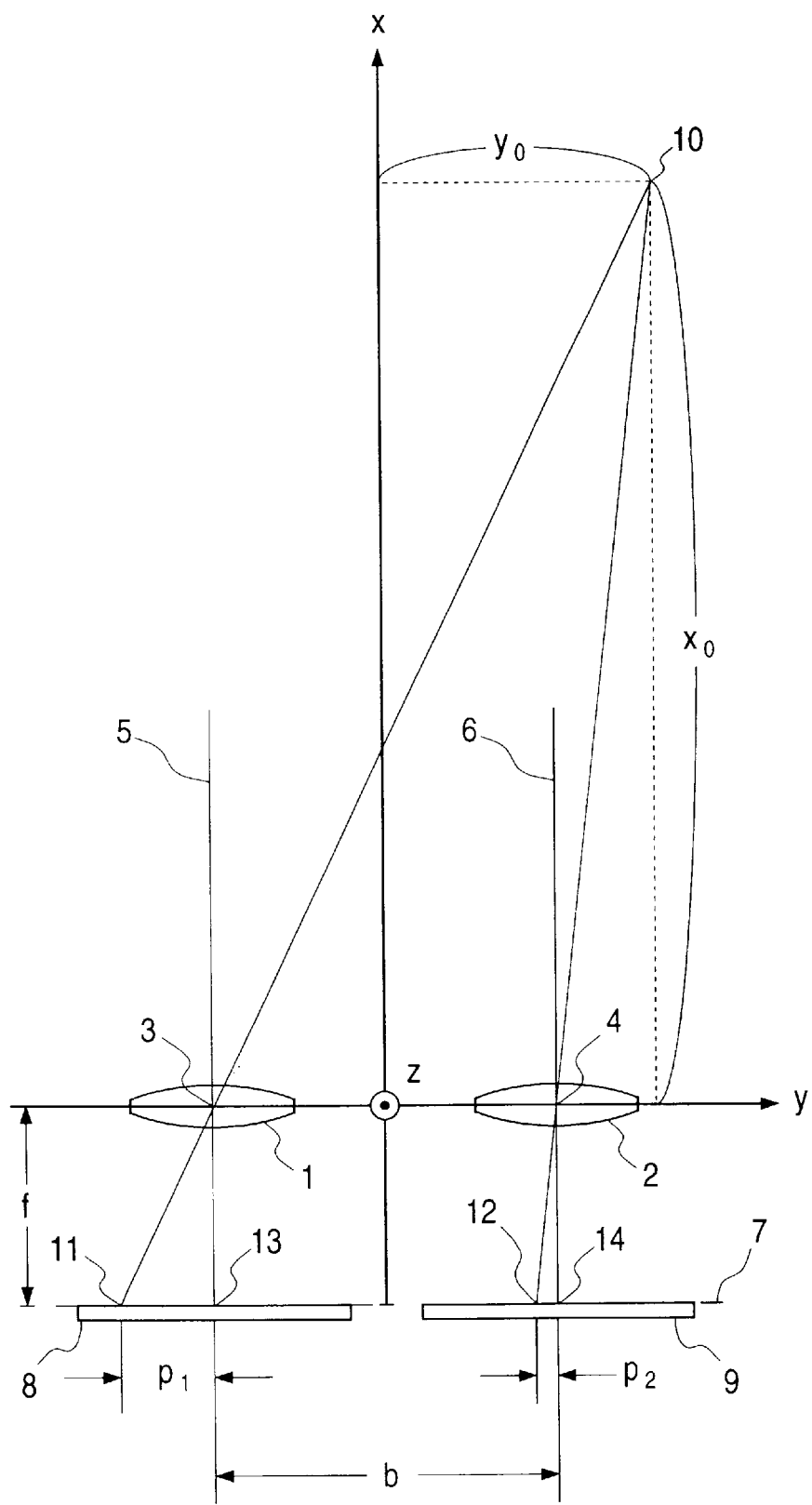
FIG. 8 is a view for explaining the principle of distance measurement based on the stereoscopic method.
Figure 9A:
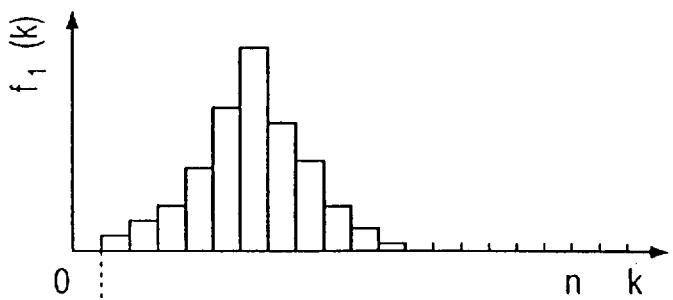
FIGS. 9A to 9C are graphs for explaining an example of the correlation calculation.
Figure 9B:
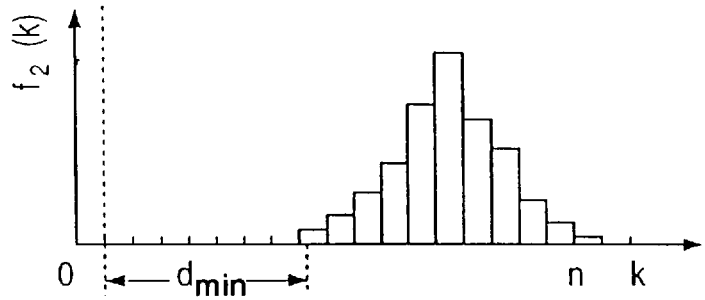
Figure 9C:
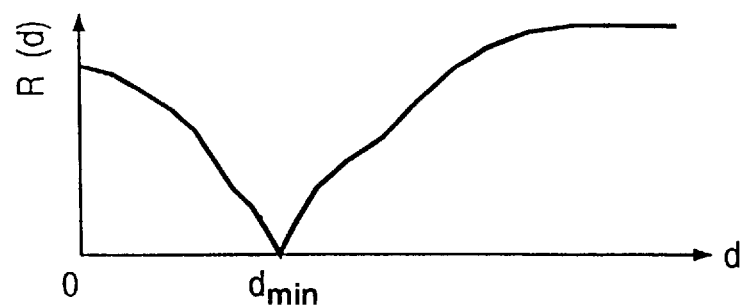

In this embodiment, the signal extraction area is set in correspondence with the entire area determined to be a main object. However, in practice, the signal extraction area can be a portion in the area determined to be a main object. For example, when it is determined that the object appears to be a person, a signal extraction area 34 is set in correspondence with the shape of the face portion of the main portion indicated by hatching in FIG. 7C, and the focal point can be accurately adjusted to the face of a person while eliminating the influence of the perspective conflict. Also, after correlation calculations are performed by setting a plurality of signal extraction areas in correspondence with the shapes of a plurality of portions such as the face portion, body portion, and the like of a person, data with a high reliability may be selected from the plurality of calculation results.

Figure 12:
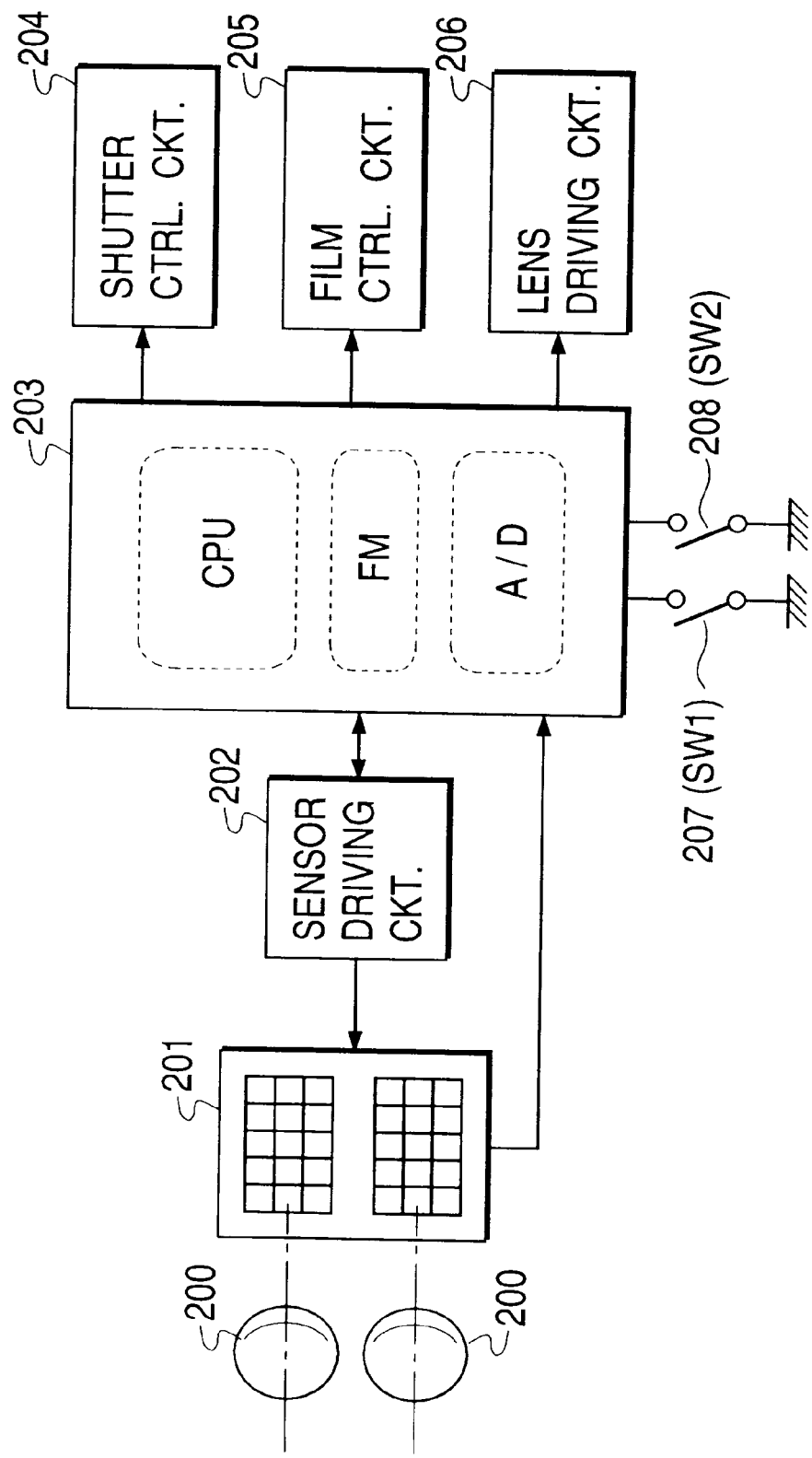
FIG. 12 is a schematic block diagram showing the arrangement of a camera according to still another embodiment of the present invention.

FIG. 12 is a schematic block diagram showing the arrangement of a camera according to still another embodiment of the present invention.

Referring to FIG. 12, lenses 200 are arranged in front of an area sensor 201 (e.g., a CCD) as a two-dimensional array of very small light-receiving pixels. The area sensor 201 is driven by a sensor driving circuit 202. A microcomputer 203 comprises an A/D converter for converting the output from the area sensor into a digital signal, a frame memory (FM) for storing an image signal A/D-converted by the A/D converter, and a CPU for performing the creation of a distance map, grouping, and the like, as will be described later.

A shutter control circuit 204 controls the open/close state of a shutter, and a film control circuit 205 controls the film feeding operation. A lens driving circuit 206 drives the photographing lens on the basis of distance measurement information selected by the microcomputer 203. A switch (SW1) 207 is turned on when a release button (not shown) is depressed to its first stroke position, and a switch (SW2) 208 is turned on when the release button is depressed to its second stroke position.

A series of operations executed by the microcomputer 203 will be described below with reference to the flow chart shown in FIG. 13.

In step (101), it is checked if the switch SW1 is turned on when the release button (not shown) is depressed to its first stroke position. If the switch SW1 is OFF, the flow stays in this step until the switch SW1 is turned on.

Thereafter, when the switch SW1 is turned on, the flow advances to step (102), and the area sensor 201 is driven via the sensor driving circuit 202. The photographing frame is broken up into blocks, and known calculations are performed in units of blocks, thereby calculating the distances to objects in the blocks. As a result, the distance map that represents the distribution state of the distance in the entire photographing frame is created.

Figure 17:
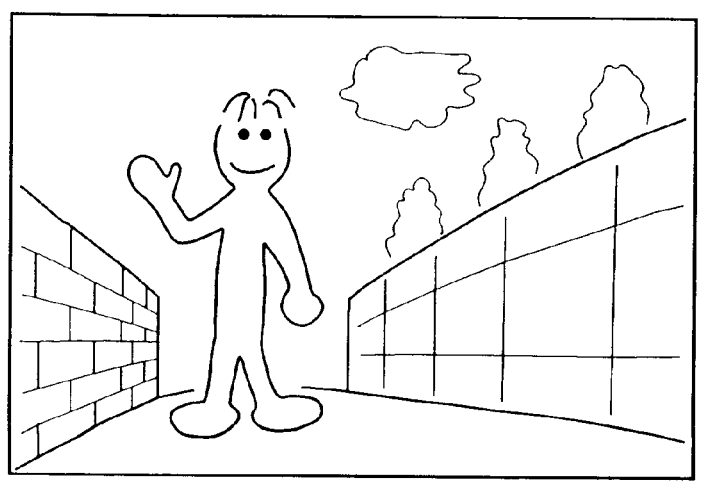
FIG. 17 is a view showing an example of the photographing scene for explaining the difference between the effects of the prior art and the embodiment shown in FIGS. 12 and 13.
Figures 18, 19:
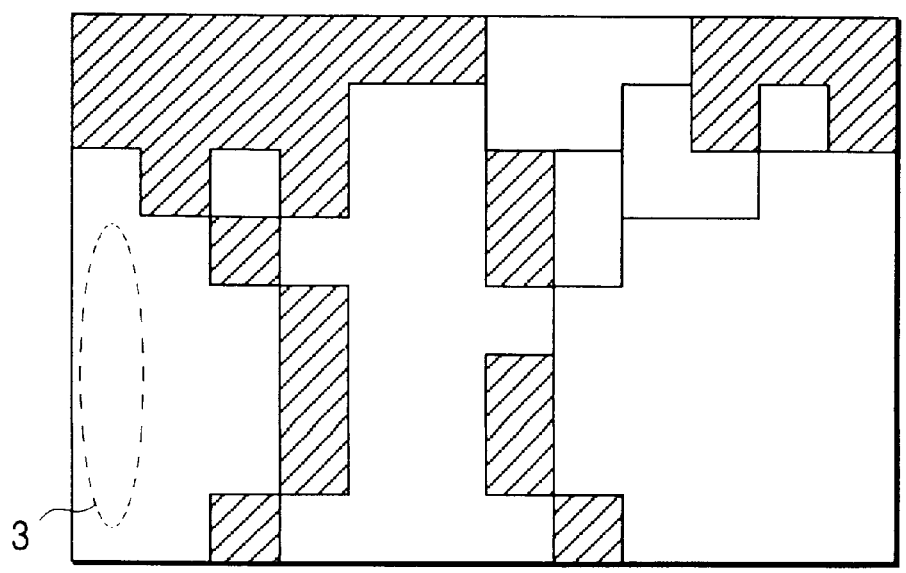
FIG. 18 is a view showing an example of the distance map of the image shown in FIG. 17.
FIG. 19 is a view showing an example of the grouping result of FIG. 18.
Figure 20:
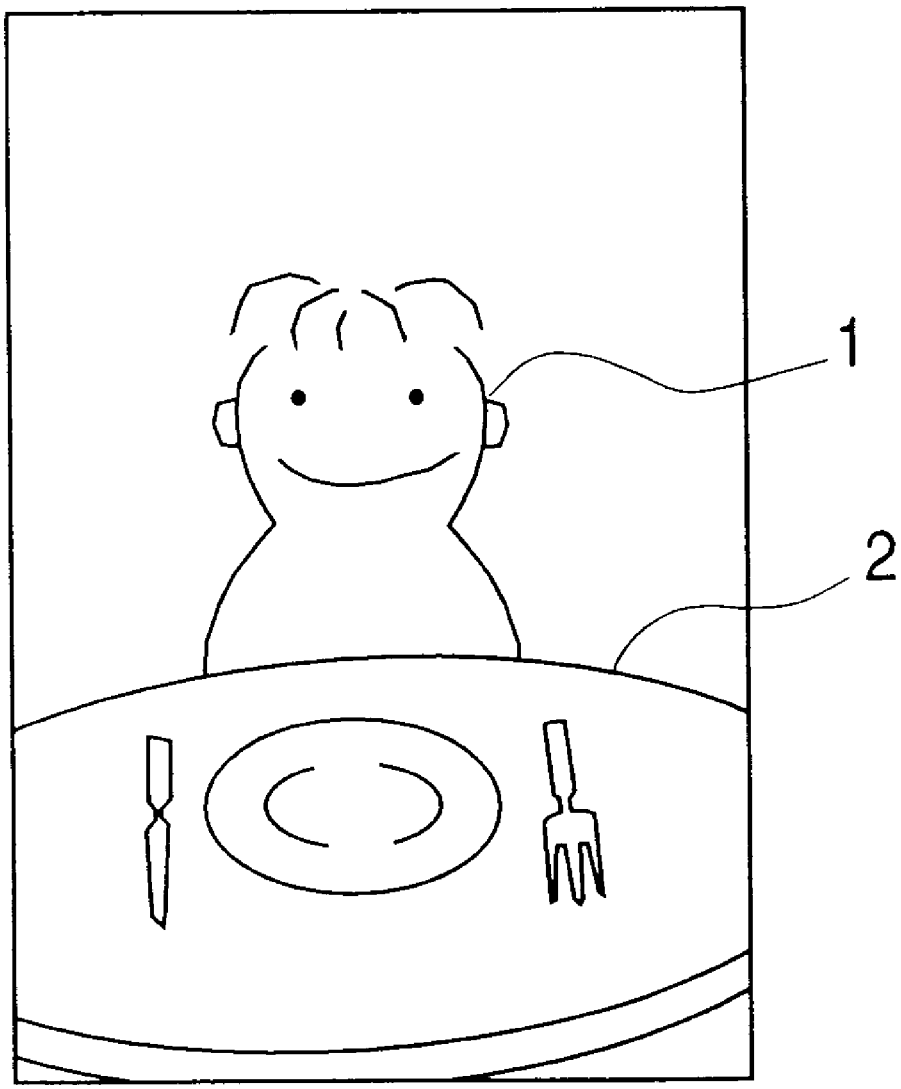
FIG. 20 is a view showing an example of the photographing scene as a weak point in the conventional apparatus.

For example, in the case of a photographing scene shown in FIG. 17, the distance map shown in FIG. 18 is created.

In step (103), grouping is performed on the basis of the distance map data.

As a grouping method, a method of determining, for all adjacent blocks, that two blocks form an identical object if the difference between the distances (or defocus amounts) of two adjacent blocks is equal to or less than a predetermined value is known. Hence, a detailed description thereof will be omitted.

As a result of this discrimination, data obtained by dividing the photographing frame into areas in units of objects can be obtained, as shown in FIG. 19.

In step (104), the main object is determined from all objects (groups) constituting the frame.

As an element for determining the main object, conventionally, the nearest priority algorithm is popular, and in the case of the photographing scene shown in FIG. 17, an area 3 shown in FIG. 19 is nearest. As a result, the focal point is adjusted to a wall. As another evaluation element, the size of an object, the position on the frame, and the like may be used as discrimination elements. However, in, e.g., a photographing scene shown in FIG. 14, although an object in an area 4 is to be determined as a main object, an area 5 has better conditions than the area 4 in terms of the distance, size, and position, and an object in the area 5 is determined to be a main object.

In contrast to this, in this embodiment, in addition to these evaluation elements, the degree of inclination of the object with respect to the photographing optical axis is calculated and evaluated, thereby accurately determining a main object.

In step (104), the inclinations of the respective groups are calculated.

An embodiment of the inclination calculation will be described below.

Figure 15:
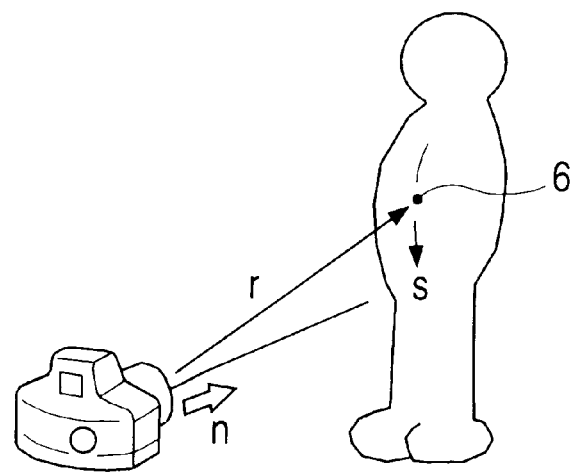
FIG. 15 is a view for explaining the inclination calculation in the embodiment shown in FIGS. 12 and 13.
Figure 16A:
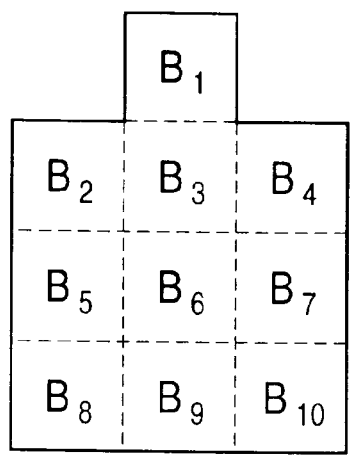
FIGS. 16A and 16B are views for explaining the group inclination calculation in the embodiment shown in FIGS. 12 and 13.

As shown in FIG. 15, when a differential route s is assumed with respect to a vector r from the camera to a point 6 on the object surface, the inclination, k, of the object surface with respect to a plane perpendicular to the optical axis is given by:

$$k=|(dr/ds)\cdot n|$$

where n is the unit vector in the optical axis direction. A case will be examined below wherein this equation is applied to the grouped areas (objects), as shown in FIG. 16A.

For the sake of simplicity, the aspect ratio of each block is 1:1, and when f represents the focal length of a lens, L represents the length of one side of each block on the imaging surface, and $d_a$ represents the average distance to each group, the average length of one side of each block on the object surface is given by:

$$m=Ld_a/f$$

When $d_i$ represents the distance to the i-th block $B_i$ in a group, the inclination $k\theta(6)$ of a block $B_6$ is calculated as follows with respect to the respective differential angles shown in FIG. 16B:

$$k_0(6)=|d_7-d_5|/2m$$

$$k_{45}(6)=|d_{10}-d_2|/2\sqrt{(2)}m$$

$$k_{90}(6)=|d_9-d_3|/2m$$

$$k_{135}(6)=|d_8-d_4|/2\sqrt{(2)}m$$

In the case of a block that constitutes the edge of a group like the block $B_1$, calculations are performed using only data of the blocks in the group in consideration of the edge as follows:

$$k_0(1)=0$$

$$k_{45}(1)=|d_4-d_1|/\sqrt{(2)}m$$

$$k_{90}(1)=|d_3-d_1|/m$$

$$k_{135}(1)=|d_2-d_1|/\sqrt{(2)}m$$

Similarly, the inclinations of all the blocks are calculated.

As exponents that represent the inclination of the entire group, the following calculations are made:

$$k_{G0} = \sum_{i=1}^{10} k_0(i)/10$$

$$k_{G45} = \sum_{i=1}^{10} k_{45}(i)/10$$

$$k_{G90} = \sum_{i=1}^{10} k_{90}(i)/10$$

$$k_{G135} = \sum_{i=1}^{10} k_{135}(i)/10$$

The maximum value of them is selected as an exponent $k_{max}$ that represents the inclination of the group.

Note that the angle with respect to the plane perpendicular to the optical axis is described by:

$$\theta_{max} \cong \tan^{-}(k_{max}/m)$$

This angle is determined to be the inclination angle of the group.

The above-mentioned inclination calculations are performed for all the groups, and the calculation results are used as evaluation elements for a main object.

Figure 14:
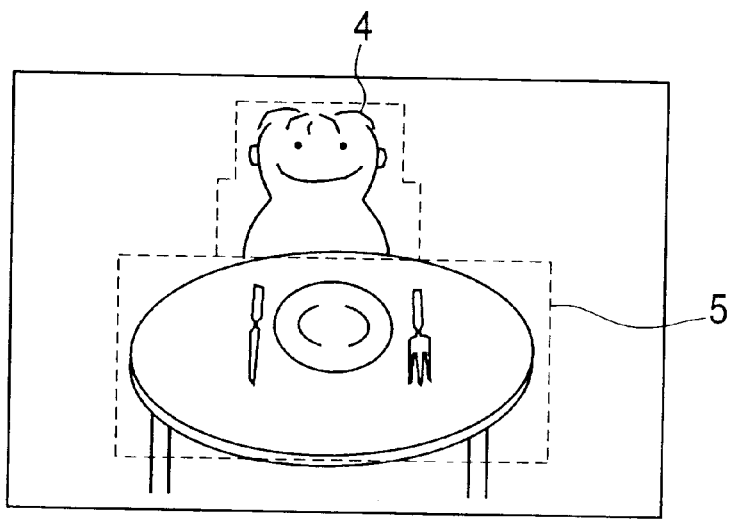
FIG. 14 is a view showing an example of the photographing scene in the embodiment shown in FIGS. 12 and 13.

For example, by adding, to the known distance measurement area selection algorithm, a condition that "a group inclined by a predetermined value (e.g., 30°) or more with respect to the plane perpendicular to the optical axis is not recognized as a main object", the wall, table surface, and the like can be excluded from main object candidates even in the photographing scene shown in FIG. 17 or FIG. 14, and the main object can be normally recognized.

In the above description, the predetermined value is set for the angle. Alternatively, when a predetermined value is set in the exponent $k_{max}$ that represents the inclination, substantially the same calculation results are expected although the inclination angles slightly vary depending on the distances.

The following explanation will be given with reference back to FIG. 13.

In step (105), a distance measurement area used in the lens driving operation is determined from the area of the group determined as in the main object in step (104), and distance measurement information is obtained.

As the discrimination algorithm of the distance measurement area, known algorithms such as the nearest priority algorithm, contrast priority algorithm, depth priority algorithm, and the like may be used, and when it is determined that the shape of the group is close to that of a person, an algorithm for selecting an upper portion as the face portion of a person as a focusing object may be used.

In step (106), the lens is driven via the lens driving circuit 206 shown in FIG. 12 on the basis of the distance measurement data determined in step (105). In step (107), it is checked if the ON state of the switch SW1 continues. If the ON state of the switch SW1 continues, the flow advances to step (108); otherwise, the flow returns to the initial state in step (101).

In step (108), it is checked if the switch SW2 is ON. If the switch SW2 is OFF, the flow returns to step (107) to check the state of the switch SW1, as described above. On the other hand, if the switch SW2 is ON, the flow advances to step (109), and the shutter control circuit 204 and a stop control circuit (not shown) are driven to execute a known exposure operation. Thereafter, the film control circuit 205 is driven to wind up the photographed frame by one frame, thus ending a series of operations.

In the description of the above embodiment, a camera comprising a distance measurement means for calculating the absolute distance has been exemplified. Of course, the present invention can be applied to a camera which comprises a focus detection device for calculating the defocus amount.

Still another embodiment of the present invention will be described below. The circuit arrangement of the camera and the entire photographing processing flow are the same as those shown in FIG. 12 and the flow chart in FIG. 13 used in the above embodiment, and hence, their illustrations are omitted.

Figure 13:
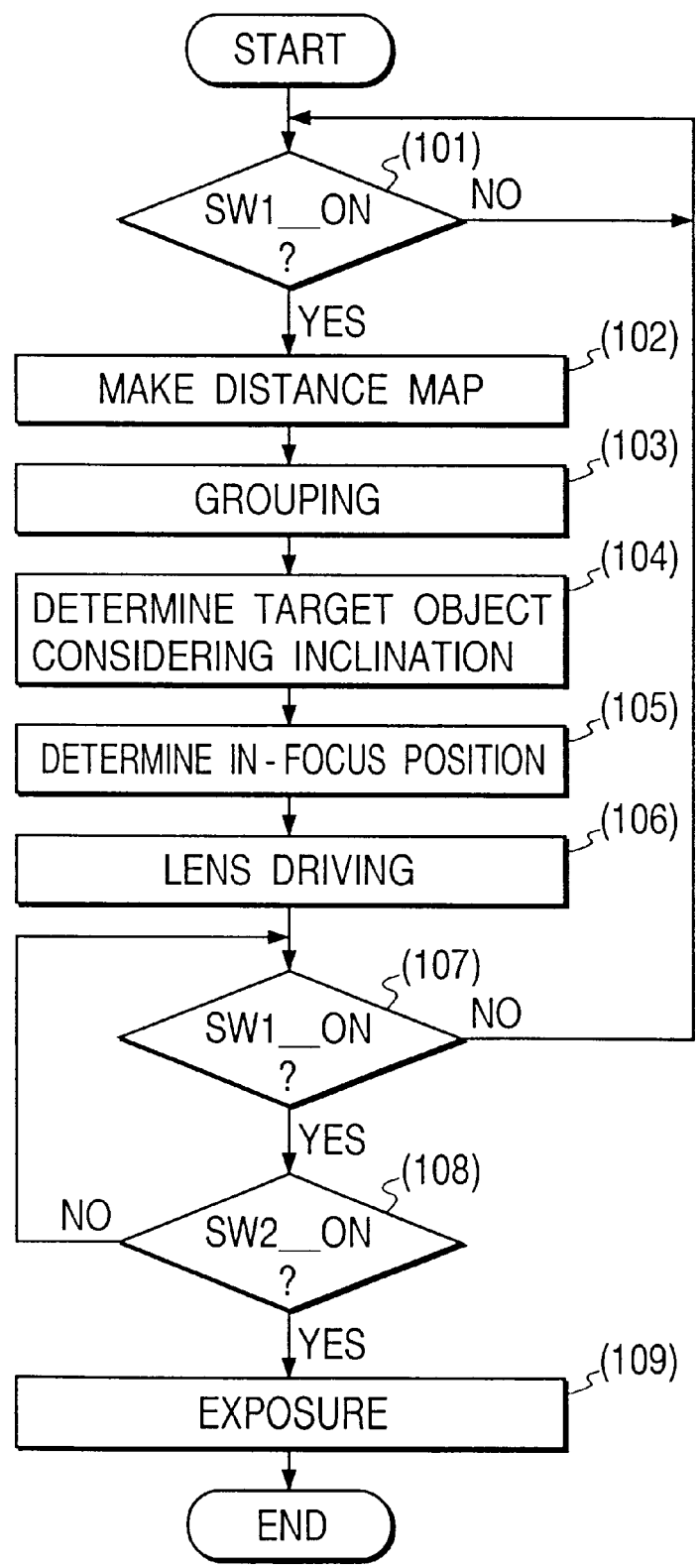
FIG. 13 is a flow chart showing a series of operations of the camera shown in FIG. 12.

The difference from the above embodiment is the discrimination algorithm of the degree of inclination in the discrimination of a main object in step (104) in FIG. 13. A simple method of calculating the degrees of inclination of the groups grouped in step (103) will be explained below.

Figure 16B:
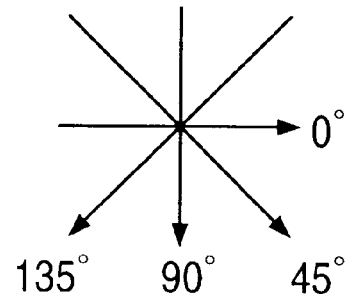

For example, maximum and minimum distances $d_{max}$ and $d_{min}$ are obtained from distance data measured on all the blocks $B_1$ to $B_6$ included in one group, as shown in, e.g., FIGS. 16A and 16B, and their difference is calculated:

$$d_{diff} = d_{max} - d_{min} \tag{1}$$

The distance difference represents the depth of the object surface, and serves as a simple measure that represents whether the object is inclined with respect to the photographing optical axis.

The above-mentioned distance difference calculation is performed for all the blocks, and the calculation results are used as evaluation elements for a main object.

When this distance difference exceeds a predetermined value, the corresponding object can be excluded from main object candidates since it has a certain inclination.

For example, when the predetermined value is set to be 1 m, the wall and table are excluded from the main object candidates since they have distance differences of 1 m or more in the scene shown in FIG. 17 or FIG. 14. On the contrary, since the erected image of a person rarely has a distance difference of 1 m or more, the main object candidate is set to be the person.

Even in a camera capable of detecting the defocus amount to the object, calculations similar to those described above can be performed. Maximum and minimum defocus values $d_{fmax}$ and $d_{fmin}$ are obtained from all the defocus results in one group, and their difference is calculated:

$$d_{fdiff} = d_{fmax} - d_{fmin} \tag{2}$$

The defocus value can be expressed as follows:

$$d_f = a/d + b \tag{3}$$

where $d_f$ is the distance to the object, and a and b are constants determined by the distance measurement optical system. Therefore, equation (2) can be rewritten as:

$$\begin{aligned} d_{fdiff} &= d_{fmax} - d_{fmin} \\ &= \{(a/d_{min}) + b\} - \{(a/d_{max}) + b\} \\ &= a \cdot \{(d_{max} - d_{min})/(d_{min} \cdot d_{max})\} \end{aligned} \tag{4}$$

Although the defocus difference varies depending on the absolute distance as compared to equation (1) above which also represents the distance difference, the presence/absence of inclination with respect to an object at a near distance position can be discriminated, and a main object discrimination can be attained based on the defocus values in consideration of the inclination.

In the above embodiment, by using a simple inclination discrimination algorithm, even a camera whose microcomputer has a low calculation speed can perform main object discrimination at high speed.

According to the above-mentioned embodiments, the photographing space is divided into many blocks, and the distance measurement results are grouped in units of blocks. Thereafter, the degrees of inclination of the respective objects are calculated, and the main object is determined by adding the calculated inclination information to the discrimination elements of the main object discrimination. In this manner, the candidate area of the distance measurement point can be effectively limited, and discrimination errors of the distance measurement point can be greatly eliminated, unlike in the prior art. Therefore, an in-focus picture of a main object that the photographer intended can always be automatically taken in every one of the photographing scenes.

In the above description, the present invention is applied to a camera, such as a single-lens reflex camera. Alternatively, the present invention may be applied to a distance measurement device, a focus detection device, or a focus adjustment device arranged in the camera, or may be applied to an environment recognition apparatus such as an air conditioner (used as an apparatus for recognizing the direction of a person, and switching the wind direction to the recognized direction), a vehicle (used as a person recognition apparatus), and the like.

Also, the present invention may be applied to an optical apparatus, such as binoculars, which comprises the distance measurement device or focus detection device that adopts the present invention, or a game machine.

What is claimed is:

1. An image signal processing apparatus for detecting a focusing state or a distance state in a plurality of areas in an observation surface, said apparatus comprising:

a selection circuit for selecting at least one of the focusing state and the distance state detected in the respective areas;

a determination circuit for determining inclination states of objects on the observation surface on the basis of the focusing state or the distance state detected in the respective areas; and a processing circuit for controlling selection processing of said selection circuit in accordance with a determination result of said determination circuit.

2. An apparatus according to claim 1, wherein said processing circuit causes said selection circuit to perform the selection processing by excluding a detection result in the area in which said determination circuit determines that the inclination state is larger than a predetermined value.

3. An apparatus according to claim 1, wherein said determination circuit determines the inclination states by calculating angles of the objects.

4. An apparatus according to claim 1, wherein said determination circuit determines the inclination states on the basis of a difference between the focusing state or the distance state in at least two areas.

5. An image signal processing apparatus for detecting a focusing state or a distance state by performing a correlation calculation of two images received by a light receiving section that includes a plurality of two dimensionally arranged photoelectric conversion elements, said apparatus comprising:

a calculation circuit which divides a first area of the light receiving section into a plurality of blocks and calculates a focusing state or a distance state with respect to each of the plurality of blocks;

a selection circuit which selects a second area included in the first area corresponding to the focusing state or the distance state of each of the blocks provided by said calculation circuit; and a control circuit which divides the second area into a plurality of blocks and causes said calculation circuit to calculate a focusing state or a distance state with respect to each of the plurality of blocks.

6. An apparatus according to claim 5, wherein said selection circuit selects a predetermined number of blocks from among the blocks of the first area.

7. An apparatus according to claim 5, wherein the blocks divided by said control circuit are smaller than the blocks of the first area.

8. An image signal processing apparatus for detecting a focusing state or a distance state by performing a correlation calculation of two images received by a light receiving portion that includes a plurality of two dimensionally arranged photoelectric conversion elements, said apparatus comprising:

a correlation circuit which divides a first area of the light receiving section into a plurality of blocks and performs a correlation calculation with respect to each of the plurality of blocks;

a selection circuit which selects a second area, included in the first area, corresponding to a correlation calculation result of each of the blocks; and a control circuit which divides the second area into a plurality of blocks and causes said correlation calculation circuit to perform a correlation calculation with respect to each of the plurality of blocks, the blocks being set smaller than the blocks of the first area.

9. An apparatus according to claim 8, wherein said apparatus determines the focusing state or the distance state in accordance with the correlation calculation results obtained using the blocks of the second area, the correlation calculation results being obtained using the blocks of the first area.

10. An image signal processing apparatus for dividing an image signal output from a light receiving section that includes a plurality of two dimensionally arranged photoelectric conversion elements into a plurality of blocks, and for detecting a focusing state or a distance state in units of blocks, said apparatus comprising:

a calculation circuit for evaluating image signals of each of the blocks; and a control circuit for designating image signals within a predetermined range of the image signal output from the light receiving portion on the basis of evaluation results of said calculation circuit, for dividing the image signal within the range into a plurality of blocks, and for causing said calculation circuit to evaluate the image signal for each of the divided blocks.

11. An apparatus according to claim 10, wherein said control circuit designates a predetermined block of the plurality of blocks as the range.

12. An apparatus according to claim 10, wherein said control circuit divides the image signal within the designated range into blocks smaller than the blocks used for evaluating the image signals by said calculation circuit, before the image signal within the predetermined range is designated.

13. An image signal processing apparatus for dividing an image signal output from a light receiving portion that includes a plurality of two dimensionally arranged photoelectric conversion elements into a plurality of blocks, and for detecting a focusing state or a distance state in units of blocks, said apparatus comprising:

a calculation circuit for evaluating image signals of each of the blocks;

a focusing circuit for performing focusing on the basis of evaluation results of said calculation circuit; and a control circuit for dividing the image signal into blocks smaller than the blocks, after the focusing operation, and for causing said calculation circuit to evaluate the image signal for each of the divided blocks.

14. An apparatus according to claim 13, wherein said control circuit divides the image signal within a range consisting of the blocks into the smaller blocks.

15. An image signal processing apparatus for dividing an image signal output from a light receiving portion that includes a plurality of two dimensionally arranged photoelectric elements into a plurality of blocks, and for detecting a focusing state or a distance state in units of blocks, said apparatus comprising:

a calculation circuit for detecting the focusing state or the distance state of each of the blocks;

a setting circuit for detecting a shape of an image on the basis of a result of the detection by said calculation circuit, and for setting a range of the blocks in correspondence with the detected shape; and a control circuit for controlling said calculation circuit to detect the focusing state or the distance state in the blocks set by said setting circuit.

* * * * *

UNITED STATES PATENT AND TRADEMARK OFFICE
CERTIFICATE OF CORRECTION

PATENT NO. : 5,913,082

DATED : June 15, 1999

INVENTOR(S) : Hitoshi ONODA

Page 1 of 2

It is certified that error appears in the above-identified patent and that said Letters Patent is hereby corrected as shown below:

COLUMN 4:

Line 3, "Such" should read --Such a--.

COLUMN 7:

Line 16, "start" should read --the start--.
Line 23, "25." should read --25a.--.

COLUMN 14:

Line 60, "$|d_4-d_1|1$" should read --$|d_4-d_1|$--.

UNITED STATES PATENT AND TRADEMARK OFFICE
CERTIFICATE OF CORRECTION

PATENT NO. : 5,913,082

DATED : June 15, 1999

INVENTOR(S) : Hitoshi ONODA

It is certified that error appears in the above-identified patent and that said Letters Patent is hereby corrected as shown below:

COLUMN 15:

Line 23, "tan⁻" should read --$\tan^{-1}$--.

Signed and Sealed this

Thirty-first Day of October, 2000

Attest:

Q. TODD DICKINSON

*Attesting Officer*     *Director of Patents and Trademarks*